M. A. ADAMS.
RECEPTACLE.
APPLICATION FILED OCT. 5, 1908.

904,745.

Patented Nov. 24, 1908.

Witnesses:
Clarence Perdue
Florence Hammel

Inventor
Mamie A. Adams
By James A. Ramsey
Attorney

UNITED STATES PATENT OFFICE.

MAMIE A. ADAMS, OF CINCINNATI, OHIO.

RECEPTACLE.

No. 904,745.   Specification of Letters Patent.   Patented Nov. 24, 1908.

Application filed October 5, 1908. Serial No. 456,268.

*To all whom it may concern:*

Be it known that I, MAMIE A. ADAMS, a citizen of the United States, residing at Cincinnati, in the county of Hamilton and State of Ohio, have invented certain new and useful Improvements in Dispensing-Receptacles, of which the following is a specification.

My invention relates to dispensing receptacles, and the object thereof is to provide a simple and economically constructed device of this character, it being more especially intended for holding salt and dispensing it as needed.

My invention consists in the combination with a receptacle having a bottom provided with an opening for the passage of the contents of the receptacle, of a plate, carrying a spout concentric with the opening in the bottom of the receptacle, and provided with slots on opposite sides of the spout and coincident in a plane lying parallel to the bottom of the receptacle between the beginning of the spout and the opening in the receptacle, and a slide, provided with laterally projecting lugs near one end, entering the slots, supported on the plate, the upper surface of the slide being adapted to lie close to the under side of the bottom of the receptacle, the plate being adapted to form a guide for the slide and the coincident slots in the plate being adapted to form stops for the slide.

My invention also consists in the parts and in the details of construction and arrangement of parts as will hereinafter be more fully described and claimed.

Figure 3:
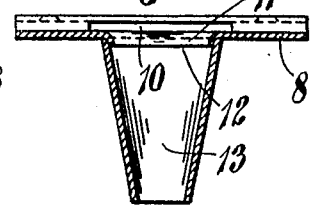
Figure 1:
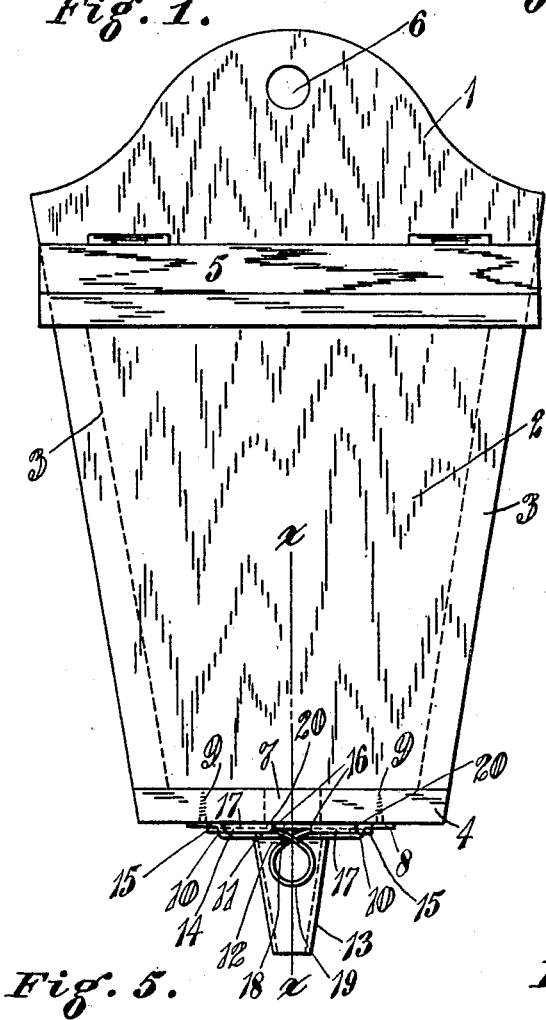
Figure 2:
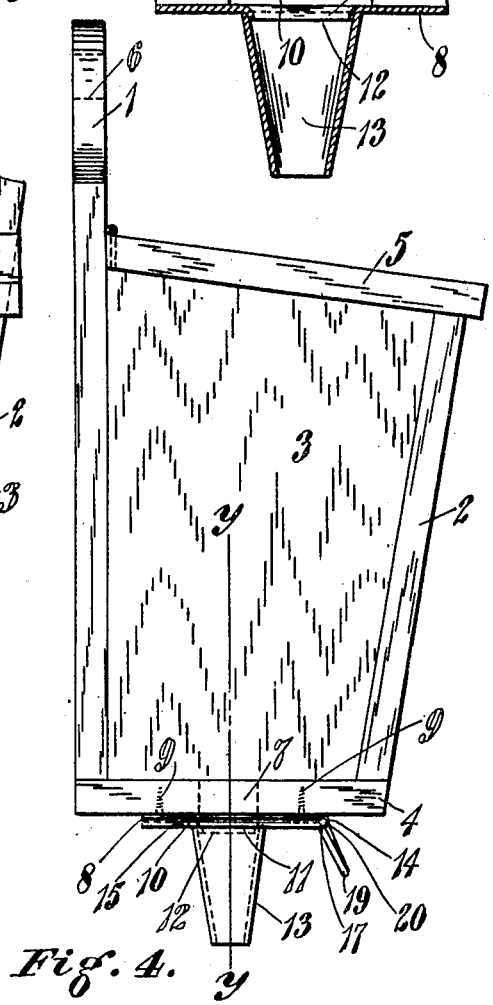
Figure 5:
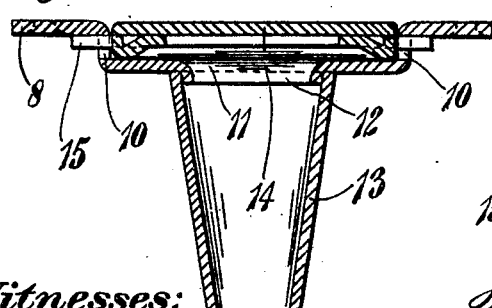
Figure 4:
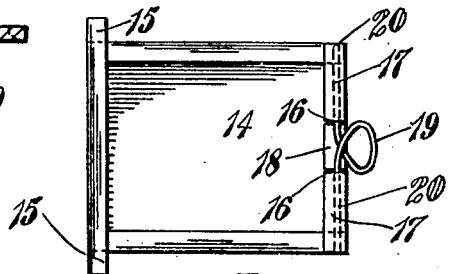

In the drawing: Figure 1 is a front elevation of a device embodying my invention. Fig. 2 is a side elevation of the same. Fig. 3 is a vertical section through the plate and the spout on a line corresponding to the line *x—x* of Fig. 1. Fig. 4 is a bottom plan view of the slide. Fig. 5 is a vertical section through the plate and the spout on a line corresponding to *y—y* of Fig. 2.

The receptacle is preferably constructed with a vertically extending back 1 and a front 2, converging downwardly toward the back, and sides 3 converging inwardly toward each other. The bottom 4 is secured on the lower edges of the back, front and sides so that it presents a smooth, continuous lower surface, and a lid 5 is hinged to the back, the sides being so shaped that the lid 5 inclines forwardly where it rests on them to close the receptacle at the top. The back 1 extends above the lid 5 and is provided with an opening 6, by means of which the receptacle may be conveniently hung in position for use. Approximately in its center, the bottom 4 is provided with a vertically extending opening 7 through which the contents of the receptacle may pass downwardly out of it.

The plate 8 is in the form of a shallow channel extending from the front part to the rear part of the bottom, where it is secured to the under surface thereof by means of screws 9 passing through openings near its sides, the shallow channeled part being relatively wide and comprising the middle part of the plate. In the sides of this channeled part the plate is provided with slots 10, extending parallel to the length of the channeled part and coincident with each other on a plane parallel with the lower surface of the bottom of the receptacle. Centrally of the channeled part of the plate, and in position to be in alinement with the opening 7 in the bottom of the receptacle when the plate is secured in position thereon, is an opening 11, around which extends a downwardly turned annular flange 12, by means of which a spout 13 is secured to the plate by soldering or other suitable means. This opening 11 is of greater diameter than the opening 7 in the bottom of the receptacle, and the walls of the spout 13 converge downwardly from their beginning around the opening 11, so that the lower end of the spout 13 is about the same diameter as the diameter of the opening 7 in the bottom of the receptacle. Thus the spout 13 performs the function of a funnel and is adapted to receive all of the contents of the receptacle which pass through the opening 7 in the bottom thereof, and to deliver the contents into any vessel which may be introduced under the end of the spout.

The slide 14 is composed of a rectangular piece having slits cut inwardly from its sides near one end, and having these sides turned under throughout their extent between the slit and the other end of the slide, to form beads at the sides of the slide. The end of the slide adjacent to the slits is also turned under in such a manner that a bead is formed which extends along this end of the slide, including the parts lying between the end and the slits, and forms lateral projections 15 on opposite sides of the slide at the end, which projections are adapted to extend into the coincident slots 10 in the sides of the channeled part of the plate. The other end of the slide is provided with two slits 16, near to and equally distant from the middle of the end, so that the end is divided into two parts 17, each lying adjacent to one side of the slide, and a middle part 18 between the slits 16. All three of the parts are turned under to form a bead along this end of the slide, but a loop 19 has its ends 20 introduced behind the parts 17, which are folded around it, and it is secured to the slide thereby in such position that the loop 19 extends downwardly from the end of the slide. The part 18 is folded closely against the main part of the slide so that a space is left for the loop 19 in the middle. This loop 19 forms a handle for the slide.

The slide 14 is so proportioned that when the beads are formed around its sides, it will be of a width to slide freely in the channeled part of the plate 8. The folds above described are all turned under the lower side of the slide, so that the upper surface of the slide is left smooth, and this surface is adapted to bear closely against the lower surface of the bottom of the receptacle when the projections 15 are in position in the slots 10 in the plate 8. The channeled part of the plate 8 receives the main part of the slide 14 and forms a support and guide therefor, while the ends of the slots 10 serve to limit the degree of movement of the slide and prevent its complete withdrawal from the channeled part of the plate. These slots are so proportioned and located, with respect to the opening 7 and the spout 13, that the slide 14 may be drawn forward and leave the space between the opening 7 and the upper end of the spout 13 open for the passage of the contents of the receptacle, and to allow the slide to be pushed backward to close this space and prevent the passage of the contents from the opening 7 into the spout 13. The slide 14, being provided with the beads around its edges, and with the projections 15, forming integral parts of one of the beads, and lying in the plane between the upper end of the spout 13 and the opening 7, is thus constituted a rigid structure with a smooth upper surface and smooth edges where it contacts with its guiding plate 8, so that it forms a conveniently operated sliding cut-off for the receptacle, of combined strength and lightness.

This convenience of operation of the sliding cut-off greatly facilitates the filling of numerous small containers, such as salt holders. The funnel shaped spout with its upper end of larger diameter than the opening in the bottom of the receptacle and its lower end sufficiently small to conveniently enter the opening in the small container, thus avoiding the spilling of any of the substance handled, also greatly adds to the facility of filling such small containers. Presenting a continuous structure across the space through which it slides, it does not permit of the passage of any of the centents of the receptacle in any direction otherwise than into the spout 13, so that waste of the contents and clogging of the operating parts of the cut-off are prevented. The slide proper being composed of a single piece of material and having the lugs formed thereon, as above described, may be economically constructed as is desirable in a device of this character.

Having described my invention, what I claim as new and desire to secure by Letters Patent is:

As a new and improved article of manufacture, the combination with a receptacle having a bottom with a smooth continuous lower surface, and an opening therethrough, of a plate secured to the lower surface and having a channel shaped part provided with slots in the sides of the channel shaped part, lying in a plane parallel to the lower surface of the bottom of the receptacle and coincident with each other, the plate having an opening therein, and a spout extending downward therefrom coincident with the opening in the bottom of the receptacle, and a slide having its sides turned downward to form beads on its lower surface and having slits whereby projections are left on its sides near one end, said end of the slide being turned down to form a bead with which the lateral projections are integral, said lateral projections being adapted to extend into the coincident slots in the plate, and the slide being adapted to lie within and be guided by the channel shaped part of the plate and to present a continuous structure across the space between the opening in the receptacle and the spout on the plate, substantially as and for the purposes set forth.

MAMIE A. ADAMS.

Witnesses:
   JAMES N. RAMSEY,
   CLARENCE PERDEW.